Patented Feb. 10, 1953

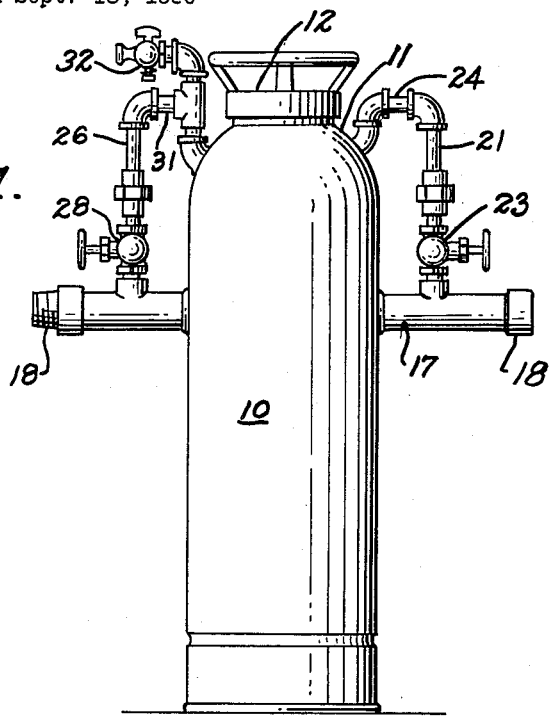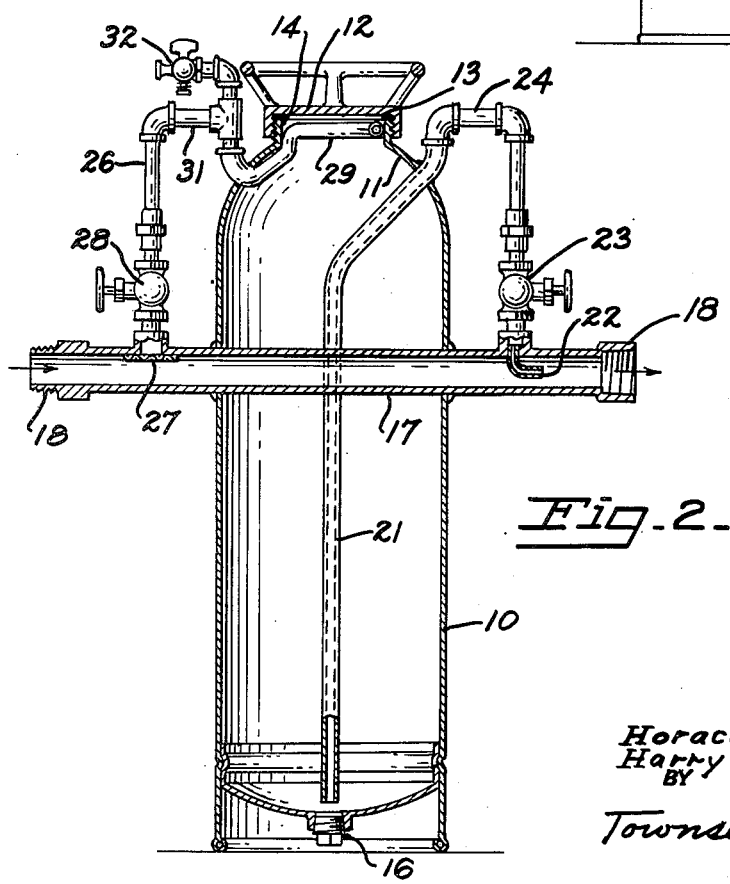

2,628,129

UNITED STATES PATENT OFFICE 2,628,129

ADDITIVE PROPORTIONER FOR FLUID LINES

Horace Wilmot Hosmer and Harry Elmer Chamberlain, Belmont, Calif.

Application September 18, 1950, Serial No. 185,458

2 Claims. (Cl. 299—84)

This invention relates to additive proportioners for fluid lines. More particularly, the invention relates to apparatus for adding a metered quantity of a first liquid to a flowing stream of a second liquid. A particular application of the invention is the addition of wetting agent to a water stream for use in extinguishing fires. Another application of the invention is the addition of a chemical detergent to a water line.

In carrying out the invention, a sealed tank initially filled with additive agent is provided adjacent the water line. Additive agent is withdrawn from the tank and injected into the water stream. The space occupied by the additive agent displaced is filled by water bypassed out of the water stream and deposited in the tank. The amount of additive injected into the water line may be regulated by means of a valve in the bypass line so that a metered quantity of liquid may be injected into the water line.

One of the features of the invention, as hereinafter described, is the fact that a uniform concentration of additive agent is injected into the water stream regardless of the level of additive agent in the tank, and, therefore, the necessity for frequent manipulation of the regulating valve is minimized.

Another feature of the instant invention is that the instant device may be filled with additive chemical while water continues to flow through the water line.

Still another feature of the invention is the fact that the tank may be partially emptied at one time, then stored, and then reused until the additive agent is exhausted.

Another advantage of the invention is that water and a liquid chemical additive of greater density than water may be stored in the tank of the present invention without undue mixing of the two even though the tank is subjected to considerable movement such as occasioned when attached to a fire truck.

At the present, it is considered desirable to add certain chemicals to water used in extinguishing fires, said chemicals reducing the surface tension of the water, thereby increasing its "wetness" or the penetrating value of the water for fire fighting. The instant device is used to inject such additive chemicals into a fire fighting hose line. The device is readily portable to the locus of the fire and may be quickly coupled into a hose line at any of the couplings thereof. The amount of additive chemical employed depends upon the type of fire encountered; by regulation of the needle valve employed in the apparatus hereinafter described, the amount of chemical added may be carefully regulated, and once said valve is set, it need not be reset despite diminution of the quantity of chemical in the tank.

Other objects of the present invention will become apparent upon reading the following specification and referring to the accompanying drawings in which similar characters of reference represent corresponding parts in each of the several views.

In the drawings:

Fig. 1 is a side elevation of the apparatus.

Fig. 2 is a vertical mid-section thereof.

As has been stated, the instant invention is capable of various uses wherein it is desired to inject a small quantity of liquid chemical into a line transmitting a larger quantity of different liquid. For purposes of convenience, it will be assumed that the instant invention is used to inject additive wetting agent to a stream of water used to extinguish fires, it being understood that the invention is capable of other uses which will be apparent to those skilled in the art to which this invention pertains.

A cylindrical liquid and air-tight tank 10 is provided, said tank being of the type commonly used in soda and acid fire extinguishers. Said tank is formed with a neck 11 at the top, the exterior of said neck being threaded to receive screw cap 12 with a gasket 13 interposed in said cap to seal against the lip 14 of the neck and prevent air or liquid from entering or leaving the tank once the cap is tightened. The bottom of the tank is concave and a drain plug 16 is provided at the lowest point of said bottom. Said tank is initially filled with additive agent and thereafter the cap 12 is screwed tight and the vessel is sealed.

Passing through the tank at any convenient location is pipe 17 having hose connections 18 at opposite ends thereof for coupling to a standard fire hose. It will be understood that there is no direct communication between said pipe 17 and said tank 10. Preferably said pipe 17 is so positioned relative to said tank that the ends of the pipe provide a convenient handle for carrying the tank and the tank is well-balanced when so carried.

Leading upward from the lowest point in the bottom of tank 10 is syphon tube 21 which extends through the side of the tank adjacent the top thereof and is connected by means of various pipe fittings to small tube 22 bent at right angles positioned midway in the downstream end of pipe 17, the open end of said tube 22 being directed downstream. The diameter of said tube 22 is such as not materially to affect the flow of water through pipe 17, but creates an obstruction such that the water traveling therearound creates a natural vacuum or suction. In the line leading to tube 22 is gate valve 23 manually operable to open and closed positions. Said valve is normally open during use, but may be closed while the apparatus is being transported or while it is being refilled during use, as hereinafter appears. It will further be noted that the highest point 24 of elevation of the syphon line 21 is higher than the highest point of liquid level in said tank 10. The reason for the latter construction is to prevent overflow of additive liquid out through tube 22 when the tank is being refilled. In use, the flow of water through pipe 17 wil draw chemical additive up from the bottom of the tank 10 through well-known syphon principles. It is necessary that the cap 12 on tank 10 be tightly closed because the high pressure of the water in the hose line 17 will otherwise cause the water to back up through syphon tube 21.

As has been stated in the preceding paragraph, in order for a proper syphon action to take place, tank 10 must be sealed when the apparatus is in operation. However, the liquid displaced by syphoning out of the additive agent must be replaced in order to maintain the balanced pressure in the tank necessary for a proper syphon action. Accordingly, as additive chemical is drawn off from the bottom of the tank, water is added at the top of the tank, said water being derived from the stream of water passing through pipe 17. Thus an intake branch line 26 leads off from the upstream side of pipe 17, there being preferably a screen 27 interposed at the intake of line 26 to prevent foreign substances which might be present in the water from being drawn into tank 10. The branch line 26 passes through the needle valve 28 and up around through various conventional pipe fittings to intake tube 29 which passes through the side of tank 10 adjacent the top thereof and then bends around and up to the very top of said tank so that any water entering through tube 29 is added at the top of the tank, thereby preventing so far as possible any mixing of the water and additive. It will further be noted that the maximum elevation 31 of tube 26 is higher than the highest possible liquid level in tank 10 in order to prevent overflow of chemical additive while the tank is being filled, as is likewise the case with the maximum elevation 24 of syphon tube 21. Petcock 32 is connected into the water intake tube 29, the purpose of said petcock being to break any air lock which might exist in tank 10 or in water intake line 26. If any air is present in said intake line, the operator opens said petcock 32 until water runs out and then closes the same; thereby any air in line 26 or in the top of tank 10 is bled out of the system.

It will thus be seen that as chemical additive is drawn out from the bottom of tank 10 water is added to the top of the tank to replace the chemical withdrawn. The rate of withdrawal may be regulated by means of regulating needle valve 28, for the amount of chemical withdrawn is directly proportional to the amount of water added at the top. The chemical additive is of considerably greater specific gravity than water, and, therefore, there is no tendency of the two to mix. Further, no air space is provided within tank 10, and, as is well known, two liquids mix together less readily when in closed vessels without air space than is the case when air space is provided. Thus, syphon tube 21 draws off the chemical additive from the bottom of the tank 10 and, since there is no dilution of the chemical additive by the water entering at the top of the tank, if a constant rate of entry of water at the top of the tank is maintained, a constant concentration of chemical additive in the water at the discharge end of the apparatus is likewise maintained. Thus, assuming a uniform rate of addition of wetting agent is desired, depending upon the type of fire encountered, the operator sets needle valve 28 to deliver the required concentration of agent in water line 17, and thereafter he may disregard such setting so long as the same concentration is required. If conditions of the fire change, it is, of course, simple to readjust valve 28 dependent upon the conditions encountered and mixture required.

In operation, assuming tank 10 to be filled with chemical additive, upon reaching the fire, pipe 17 is connected into a water supply source and hose line by means of couplings 18 at the intake and discharge side thereof. Needle valve 28 is opened, and then gate valve 23 is fully opened to permit discharge of chemical additive. A syphon is initiated which draws chemical additive from tank 10 up through tube 21 and out through tube 22 in the discharge end of the pipe 17. Simultaneously, water is drawn up through water intake pipe 26 and emitted at the top of tank 10 through tube 29 to replace the chemical additive drawn off. The amount of chemical additive injected into the water line may be regulated by regulation of needle valve 28. If, at the commencement of the operation, it is found that no chemical additive discharges, it is probably due to an air lock in the water inlet line. Accordingly, petcock 32 is opened until water is emitted and the air lock is broken. When the supply of chemical additive in the tank is exhausted, gate valve 23 and needle valve 28 are closed, thereby permitting water to continue to pass through pipe 17 without interference, although, of course, no chemical additive is being injected. Thereupon screw cap 11 is opened, the water in the tank is emptied either through inversion of the tank or through drain plug 16 in the bottom of the tank, and chemical additive is then poured into tank 10 from another container until tank 10 is full of such additive. After screw cap 12 has been replaced and tightened, the device is again ready for use, and, accordingly, the operator opens gate valve 23 and adjusts needle valve 28 to produce the desired foaming effect.

Tank 10 is at all times filled with liquid to permit uniform delivery of whatever concentration of chemical additive is desired without resetting of needle valve 28. When it is desired to refill the tank while water is flowing through pipe 17, both valves 23 and 28 are closed. This permits filling the tank to the brim with the least possible air space at the top of the tank. The fact that there is little or no air space in the top of the tank prevents dilution of the chemical additive by water despite agitation or shaking of the tank as would normally occur if the tank were mounted on a fire truck or the like. It is relatively difficult to mix two liquids of different density in a completely filled container, whereas if the container is only partly filled and agitated, mixing is facilitated. A single valve 28 may be employed, thus eliminating valve 23, but in this event there is a slight dripping or bleeding of chemical additive from the syphon which lowers the liquid in the tank sufficiently to create an air space at the top which increases the likelihood of dilution of the additive with water, and this dilution may be sufficient to require periodic regulation of needle valve 28. With a valve at each end of the apparatus; i. e., with a needle valve 28 and a gate valve 23, this bleeding can be prevented, thus offering positive assurance of a filled tank at all times. Thus dilution is diminished or obviated and needle valve 28 may be set at a specified position at all times for a fixed ratio of chemical to water.

Although the present invention has been described in rather considerable detail by way of illustration and example for purposes of clarity of understanding, it is understood that certain changes and modifications may be made within the spirit of the invention and scope of the claims appended hereto.

We claim:

1. An additive proportioner for injecting metered quantities of chemical to a water line comprising, a tank, a closure for said tank at the extreme top thereof, a pipe in said water line extending through said tank below the top thereof, an intake line communicating with said pipe on the upstream side of said tank, said intake line terminating in said tank at the extreme top thereof adjacent said closure, said intake pipe having its maximum normal elevation higher than said tank, a control valve in said intake line, a syphon tube having an inlet port at the bottom of said tank, said tube having its maximum normal elevation higher than said tank, said syphon tube being of a diameter substantially less than said pipe terminating in said pipe at the downstream side of said tank, and a terminal for said tube having a right angle bend pointing downstream.

2. An additive proportioner for injecting metered quantities of chemical to a water line comprising, a tank, a closure for said tank at the top thereof, a pipe extending through said tank, an intake line communicating with said pipe on the upstream side of said tank, said intake line terminating in said tank at the extreme top thereof adjacent said closure, said intake pipe having its maximum normal elevation higher than said tank, a control valve in said intake line, a syphon tube having an inlet port at the bottom of said tank, said tube having its maximum normal elevation higher than said tank, a close-off valve in said syphon tube, said syphon tube of a diameter substantially less than said pipe terminating in said pipe at the downstream side of said tank, a terminal for said tube having a right angle bend pointing downstream, and a third valve installed in said intake line adjacent the maximum elevation thereof, said third valve being arranged to discharge air trapped in said tube to atmosphere.

HORACE WILMOT HOSMER.
HARRY ELMER CHAMBERLAIN.

REFERENCES CITED

The following references are of record in the file of this patent:

UNITED STATES PATENTS

| Number | Name | Date |
|---|---|---|
| 620,231 | Dehn | Feb. 28, 1899 |
| 811,749 | Somers | Feb. 6, 1906 |
| 1,082,141 | Sites | Dec. 23, 1913 |
| 1,137,626 | Jackson | Apr. 27, 1915 |
| 2,231,782 | Thompson | Feb. 11, 1941 |
| 2,239,502 | Gleason | Apr. 22, 1941 |